J. C. McCALL.
VALVE FOR PNEUMATIC TIRES.
APPLICATION FILED APR. 7, 1914.
1,137,768.
Patented May 4, 1915.
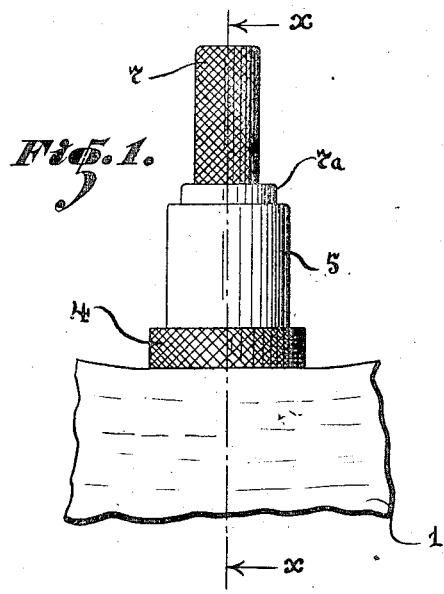
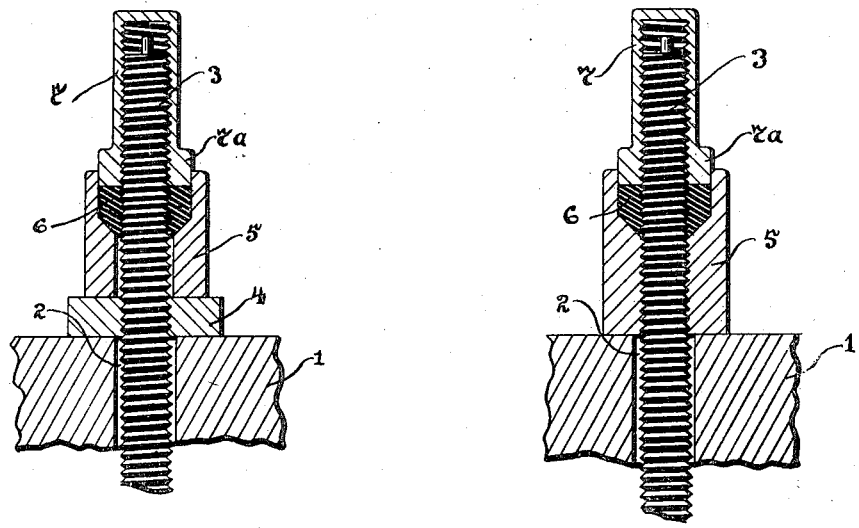
WITNESSES:
C. A. Ellis
R. E. Bruckner
INVENTOR
J. C. McCall
BY
John M. Spellman
ATTORNEYS

UNITED STATES PATENT OFFICE.

JACOB CAPSHAW McCALL, OF ROTAN, TEXAS.

VALVE FOR PNEUMATIC TIRES.

1,137,768. Specification of Letters Patent. Patented May 4, 1915.

Application filed April 7, 1914. Serial No. 830,119.

*To all whom it may concern:*

Be it known that I, JACOB C. MCCALL, a citizen of the United States, residing at Rotan, in the county of Fisher and State of Texas, have invented certain new and useful Improvements in Valves for Pneumatic Tires, of which the following is a specification.

My invention relates to a new and useful valve for pneumatic tires, and its object is to provide a valve for pneumatic tires having a packing interposed in a special manner between the valve cap and the seat thereof, the double function thus being secured of frictionally locking the cap to prevent its turning through accidental cause, and preventing an escape of air between the cap and valve stem that might otherwise occur when there is a slow leak within the valve stem.

A still further object of the invention is to provide a device of the character described that will be strong, durable, efficient and simple and comparatively inexpensive to produce, also one in which the several parts will not be likely to get out of working order.

With the above and other objects in view, the invention has relation to certain novel features of construction and operation, an example of which is described in the following specification and illustrated in the accompanying drawing, wherein:

Figure 1 is a view showing my improved valve in side elevation. Fig. 2 is an axial sectional view thereof, the section being taken upon the line $x$—$x$ of Fig. 1. Fig. 3 is a similar sectional view showing a slight modification in the construction.

Referring now more particularly to the drawing, wherein like reference characters designate similar parts in all the figures, the numeral 1 denotes the rim of a vehicle wheel, which rim is radially apertured as indicated at 2 to permit the passage of a valve stem 3. The valve stem 3 is exteriorly threaded in the usual manner and carries a lock nut 4 seated fast against the interior face of the rim. The lock nut 4 is surmounted by a metallic collar 5 mounted loose upon the valve stem, and having its outer end deeply recessed to receive a packing ring 6, tightly fitting the stem 3 and preferably formed of rubber. It is preferred to bevel the bottom of the recess receiving the packing 6, said packing being correspondingly beveled. The outer end portion of the valve stem 3 is engaged by the usual cap 7, which has its inner end enlarged as indicated at 7ª and adapted to fit snugly within the recess containing the packing ring 6, said packing ring being compressed between said cap and the bottom of said recess.

Owing to the use of the packing 6, even though a leak should occur within the valve stem 3, any escape of air from the cap will be positively prevented by the packing 6. The compression of said packing beneath the cap will furthermore have a tendency to lock the cap against any accidental rotation, preventing the cap from being lost.

In the modified form of my construction illustrated in Fig. 3, the lock nut 4 is eliminated and the member 5 has threaded engagement with the stem 3, thus itself acting as a lock nut as well as performing the function already described. In other respects, the construction of Fig. 3 is precisely the same as that illustrated in the first two figures.

The invention is presented as including all such changes and modifications as properly come within the scope of the following claims.

What I claim is:

1. In a device of the character described, the combination with a valve stem, of a collar mounted upon the stem and restricted from inward displacement, the outer end of said collar being recessed, a packing ring mounted upon the valve stem within the recess of said collar, and a cap having screw threaded engagement with the valve stem and having its inner end fitting snugly within the recess of said collar, the packing ring being compressed between said cap and the bottom of said recess.

2. In a device of the character described, a collar adjustably mounted upon the valve stem and having its outer end recessed to form a seat, a packing surrounding the valve stem and arranged within the seat in said collar, and a cap adjustably mounted upon the valve stem and adapted to be advanced in the seat of said collar to compress the packing in said seat.

In testimony whereof I have signed my name to this specification in the presence of two subscribing witnesses.

JACOB CAPSHAW McCALL.

Witnesses:
D. F. MARTIN;
J. F. KNOX.

Copies of this patent may be obtained for five cents each, by addressing the "Commissioner of Patents, Washington, D. C."